(No Model.) 4 Sheets—Sheet 1.
R. R. RICHMOND.
BURIAL DEVICE.

No. 579,806. Patented Mar. 30, 1897.

Witnesses:
H. B. Hallock.
S. S. Williamson

Inventor:
Romulus R. Richmond
By Geo. H. Holgate
Attorney.

(No Model.)  4 Sheets—Sheet 3.

R. R. RICHMOND.
BURIAL DEVICE.

No. 579,806. Patented Mar. 30, 1897.

Witnesses:
H. B. Hallock
J. J. Williamson

Inventor:
Romulus R. Richmond
By Geo. H. Holgate
Attorney.

(No Model.) 4 Sheets—Sheet 4.
R. R. RICHMOND.
BURIAL DEVICE.
No. 579,806. Patented Mar. 30, 1897.
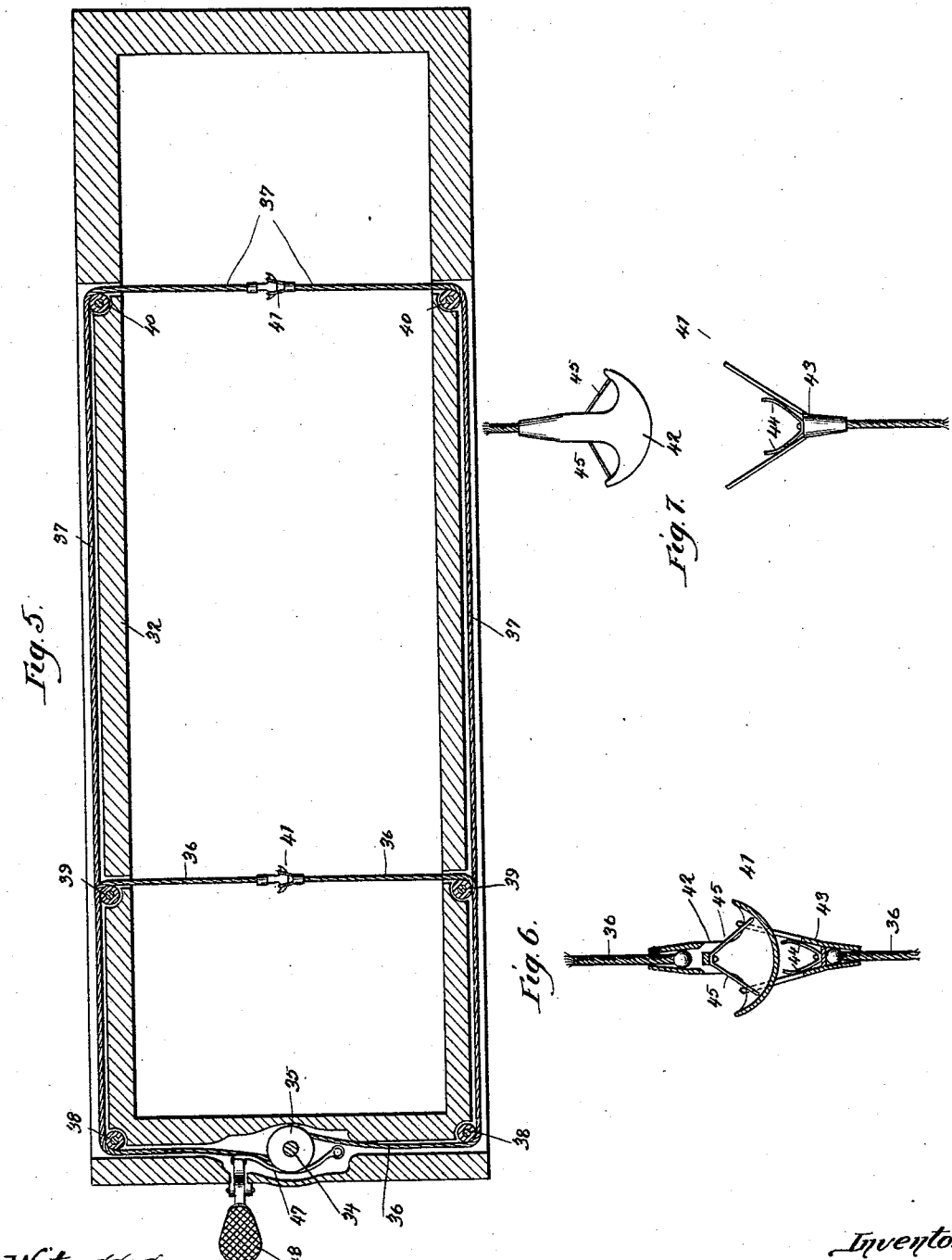
Witnesses:
H. B. Hallock.
S. Williamson.
Inventor:
Romulus R. Richmond
By Geo. H. Holgate
Attorney

UNITED STATES PATENT OFFICE.

ROMULUS RUFUS RICHMOND, OF CHARITON, IOWA.

BURIAL DEVICE.

SPECIFICATION forming part of Letters Patent No. 579,806, dated March 30, 1897.

Application filed September 1, 1896. Serial No. 604,519. (No model.)

*To all whom it may concern:*

Be it known that I, ROMULUS RUFUS RICHMOND, a citizen of the United States, residing at Chariton, in the county of Lucas and State of Iowa, have invented a certain new and useful Improvement in Burial Devices, of which the following is a specification.

My invention relates to a new and useful improvement in burial apparatus, and has for its object to provide a means whereby the earth taken from a grave may be so separated as to permit the yellow or like colored earth to be first replaced and thereafter the dark-colored earth, so that the latter may give proper top dressing for sodding or the like; and a further object of my improvement is to facilitate the lowering of the casket within the grave, so that this may be accomplished without noise or harassing effort.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1:
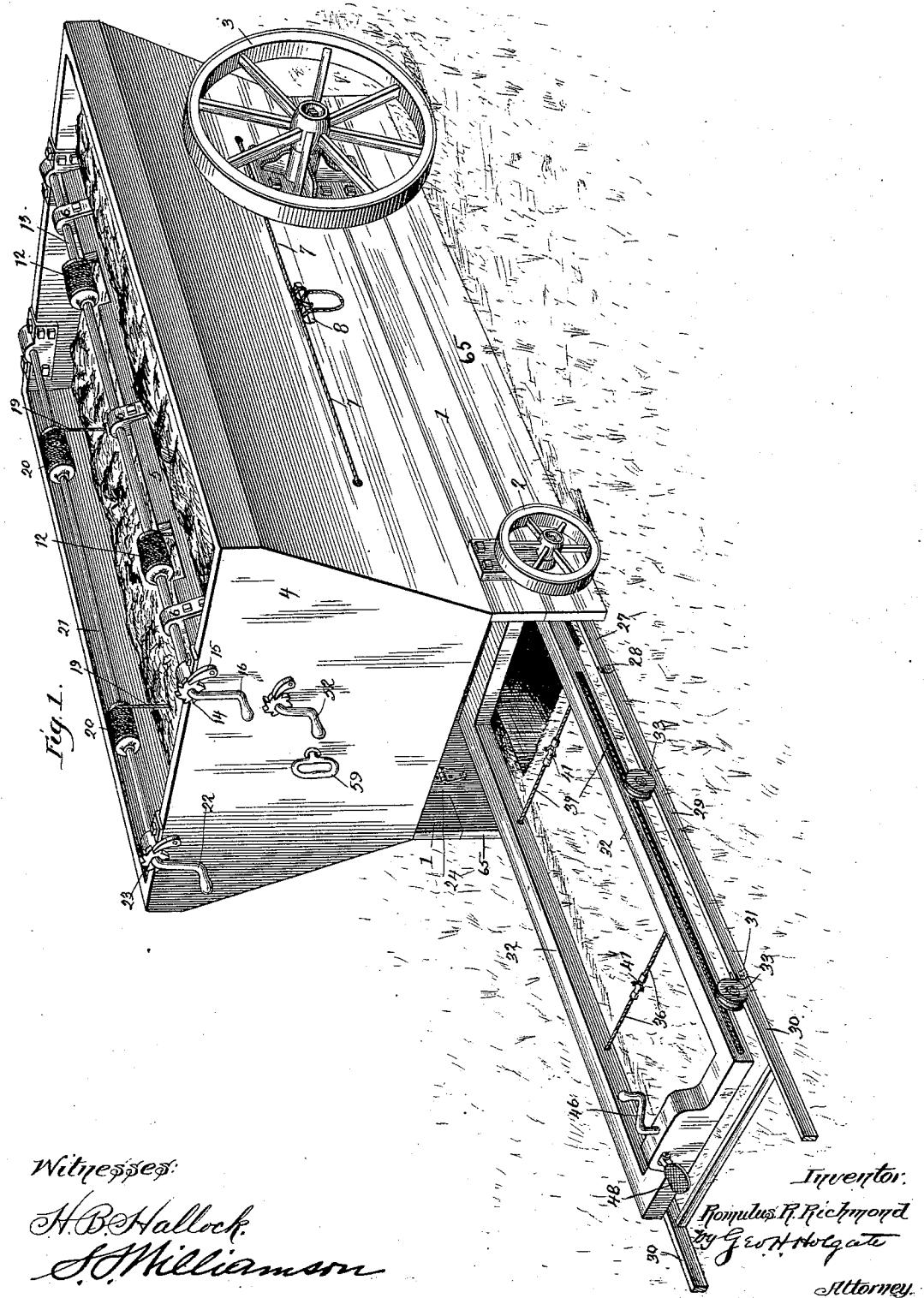
Figure 2:
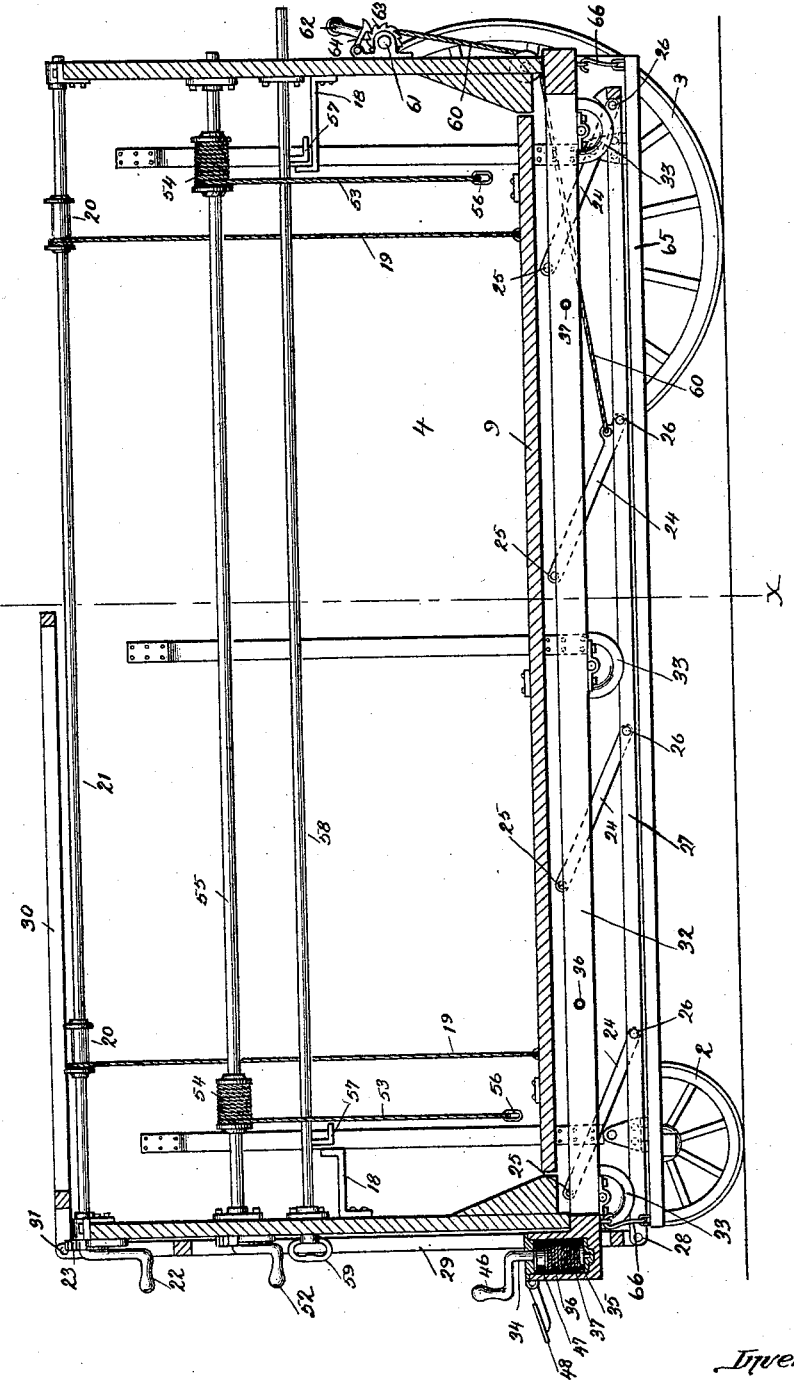
Figure 3:
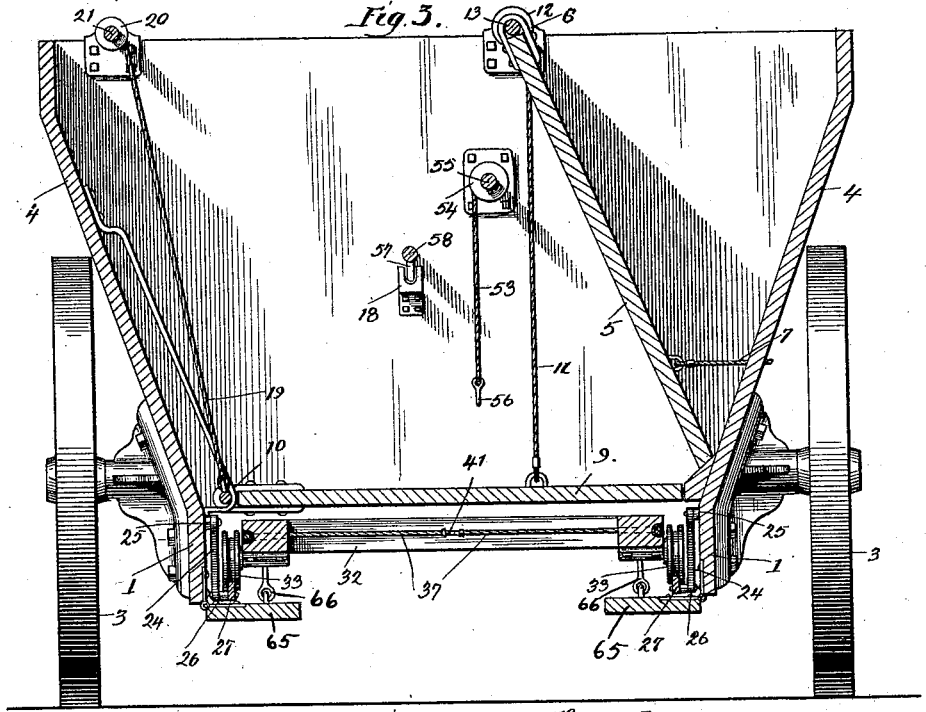
Figure 4:
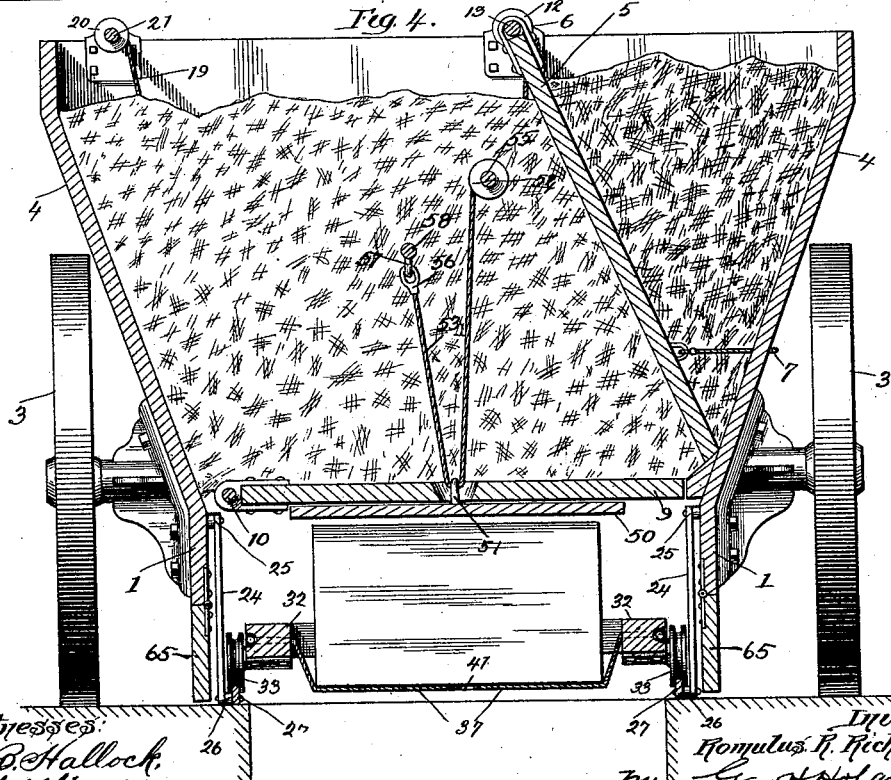

Figure 1 is a perspective of my improved apparatus in position over a grave for interring a corpse; Fig. 2, a vertical longitudinal section of the apparatus when not in use, the several parts thereof being arranged in position for the easy transportation of the device; Fig. 3, a cross-section at the line *x x* of Fig. 2; Fig. 4, a similar view showing the device in position for use and filled with earth; Fig. 5, a longitudinal horizontal section of the lowering-frame, illustrating the arrangement of the cables for bringing about the lowering of the casket; Fig. 6, a detail view of one of the automatic cable-hooks with its members in engagement; and Fig. 7, a similar view, the members being disengaged.

In carrying out my invention a truck-frame 1 of rectangular shape is mounted upon the wheels 2 and 3, so as to be conveyed from place to place after the manner of an ordinary vehicle, and built upon this frame is a hopper 4 of sufficient capacity to hold enough earth to fill a grave after the casket and box have been placed therein. The hopper is divided into two compartments by a partition 5, which is hinged at 6 and adapted to be operated by the cables 7, which pass through holes in one side of the hopper and may be attached to the cleat 8, secured upon said side. The bottom 9 of the hopper is hinged at 10, so as to swing downward, and is held closed by the cables 11, which latter are wound upon the drums 12, carried by the shaft 13, and this shaft is provided with a ratchet-wheel 14, with which engages the pawl 15 for holding the shaft against retrograde movement, and a crank 16 is also provided for the revolving of said shaft. The hinges 10 of the bottom have attached thereto the cables 19, which extend upward and pass around the drums 20, carried by the shaft 21, journaled in boxes mounted upon the top of the hopper, so that when the bottom has been swung downward within the grave and it becomes necessary to raise the same out of said grave this may be accomplished by winding the cables 19 upon their drums through the crank 22, and the bottom will be retained in this position by the engagement of a pawl with the ratchet 23, secured upon the shaft 21.

The top 50 of the box in which the casket is to be lowered is secured in place upon the under side of the bottom 9 by the cables 53, which latter pass through the eyes 51 in the top and are wound upon the drums 54, carried by the shaft 55, by means of the crank and ratchet 52, and the opposite ends of said cables are provided with eyes 56, adapted to engage the hooks 57, supported by the hand-rod 58, which latter is located lengthwise of the hopper and has its bearings in the two ends thereof and is provided with a hand-hold 59 for its manipulation. Push-offs 18 are secured to the inner surfaces of the ends of the hopper and are so arranged that when the hooks 57 are drawn forward by the rod the eyes 56 will be forced from off the hooks thereby, for the purpose hereinafter set forth.

To the frame 1, upon the inside thereof, are pivoted the levers 24 at 25, and the lower ends of these levers have pivoted thereto at 26 the main section 27 of the track, and these levers are of such a length that when the track is swung downward it will come in contact with and rest upon the ground upon which the apparatus is standing before the levers reach the perpendicular. To the main section 27 is hinged at 28 the middle swinging section 29 of the track, and in turn the anterior swinging section 30 is hinged at 31 to the middle section 29, so that when the main section 27 is elevated beneath the hopper the middle section may be folded vertically against the front end of said hopper, as shown in Fig. 2, and the anterior section 30 folded upon the top of the hopper. The object of this track is to support and permit the longitudinal movement of the lowering-frame and should be about twice the length of the truck-frame.

The lowering-frame 32 is rectangular in shape and mounted upon the trundle-rolls 33, which latter are flanged and adapted to travel upon the track in order that this frame may be slid longitudinally beneath and from under the hopper.

34 is a short shaft journaled in the front end of the lowering-frame and having secured thereon the drum 35, around which is wound the cables 36 and 37, the former passing around the guide-pulleys 38 and 39 and the latter around the guide-pulleys 38 and 40. These cables are provided with automatic hooks 41, each of which consists of two members, one end of the cable having the twin hook 42 and the opposite end having the spring-actuated eyes 43, which are given a tendency to move from each other by the spring 44. From this it will be seen that when the cables 36 and 37 are drawn taut by the winding of the drum 35 the eyes will be retained in engagement with their hooks, but when these cables are slackened the springs 44 will disengage the eyes from their hooks, thereby parting the cables in the center for the purpose hereinafter set forth, and to further insure this disengagement of the eyes from the hooks the spring-arms 45 are arranged to move outward when the strain is relieved upon the cables, thus forcing the eyes out of the curvature of the hook. A crank 46 is formed with the shaft 34 for the revolving of the drum, and a brake 47 is arranged to bear against this drum and is under the control of the foot of the operator by the lever 48.

From the foregoing description the operation of my improvement will be obviously as follows: The apparatus is placed at one end of the grave while the latter is being dug, and the earth therefrom is thrown into the hopper. When the hopper is full, the surplus earth is carted away by any suitable vehicle made for the purpose and reserved for further use in filling up and the like. Now after the grave is completed the entire apparatus is moved directly over said grave and the track is unfolded and let down on the ground, as clearly shown in Fig. 1, after which the lowering-frame is run out upon the track and the cables hooked together and drawn taut, as before described. When the funeral arrives, the casket is removed from the hearse and placed upon the cables of the lowering-frame, which latter is then pushed under the hopper and over the grave, so that by placing the foot upon the brake and the hand upon the crank 46 the casket may be safely and noiselessly lowered within the grave and box previously placed in position. After this has been accomplished a further slacking of the cables will cause the automatic hooks to be disengaged, as before described, so that a reverse movement of the crank will withdraw the cables from the grave. Now by the proper operation of the shaft 55 the lid 50, which is supported by the cables 53, passing through the eyes 51, will be lowered into place upon the box, thus protecting the casket from the earth which is to fill the grave, and the ends of these cables are freed by drawing upon the hand-rod 58, as before set forth, after which they may be wound upon the drums 54 by the proper operations of the crank 52. The light earth is first deposited within the grave by disengaging the pawl 15 from the ratchet 14, which will permit the shaft 13 to revolve, thereby unwinding the cables 11 as the bottom 9 swings downward. The shaft 21 is then revolved, so as to wind the cables 19 upon the drums 20, thus elevating the hinged end of the bottom, so as to draw the latter out of the grave. The partition 5 is next swung open by the release of the cables 7 and the weight of the dark earth thereon, thus depositing this earth within the grave upon the top of light earth which had previously been deposited, which will finish the filling of the grave, and when the operator is sufficiently skilled the several operations necessary to the interment will be performed without change of position of said operator and also without noise or commotion, thus rendering the scene of the burial free from the objectionable features now attendant upon such ceremonies.

When it is desired to disinter a body, it is only necessary to place the lowering apparatus in position over the grave and, by the use use of long hooks made for the purpose, lift the head of the casket sufficiently to put the cables thereunder, and in a similar manner place one of the cables under the foot of the casket, after which, by the revolving of the crank, the casket may be drawn out of the grave with ease.

It is to be noted that the apparatus may be manufactured in either a double or single design, that is, with or without the hopper attached thereto.

My improved apparatus may be moved from place to place within the cemetery by hand or other power, and may also be conveyed from one cemetery to another after the manner of an ordinary vehicle.

The main section of the track may be supported beneath the truck-frame in any suitable manner, but I have here shown the cables 60 attached to the posterior end of this track and arranged to be wound upon suitable drums upon the shaft 61, which carries a crank 62 for operating the same and a ratchet 63, which is engaged by a pawl 64 to prevent a retrograde movement of the shaft when the track is elevated. Furthermore, in order to hide the operations from view and prevent the dirt from scattering side wings 65 are hinged to the lower edges of the truck-frame and are so constructed as to fold up under the frame when out of use and be secured in this position by the hooks 66, engaging eyes in the bottom of the frame.

Having thus fully described my invention, what I claim as new and useful is—

1. In a device of the character described, a hopper, a folding track adjustably secured beneath it, and a frame adapted to roll on said track, as and for the purpose described.

2. The herein-described combination of a truck-frame, wheels upon which said frame is mounted, a hopper supported by said frame, a partition 5 for dividing said hopper into two compartments, cables for operating the partition, a hinged bottom for closing the principal compartment, cables for holding said bottom in closed position, drums upon which said cables are wound for opening said bottom, cables 19 attached to the hinged side of the bottom, drums upon which said cables may be wound, a shaft upon which said drums are located, a crank for operating said shaft, cables 53 adapted to be passed through staples in the top of the cover for the casket-box, eyes attached to the ends of said cables, hooks 57 with which said eyes are engaged, a rod 58 carrying said hooks, push-offs 18 for disengaging the eyes from the hooks, drums 54 upon which the cables 53 are wound, a shaft upon which said drums are mounted, and a crank for operating said shaft, substantially as and for the purpose set forth.

3. In combination with a hopper of the character described, a sectional track attached thereto by means of levers so as to be swung downward against the ground over which said track is supported, means for swinging said track downward, a trundle-frame mounted upon the track, cables arranged upon said frame, means for winding and unwinding said cables, and means for attaching and detaching the ends of said cables to and from each other, substantially as and for the purpose set forth.

4. In combination with a hopper of the character described and the parts carried thereby, a sectional track, levers for connecting said track to the hopper so that said track may be swung downward into contact with the ground, means for controlling the movement of said track, a trundle-frame, rolls upon which said frame is mounted, said rolls adapted to run upon the track, cables arranged upon the frame, a drum 35 upon which said cables are wound, a brake for controlling the movement of said drum in one direction, a crank for turning the drum in the opposite direction, and automatic hooks attached to the ends of the cables whereby the latter may be disengaged when the cables are slackened, substantially as and for the purpose set forth.

In testimony whereof I have hereunto affixed my signature in the presence of the subscribing witnesses.

ROMULUS RUFUS RICHMOND.

Witnesses:
S. S. WILLIAMSON,
W. M. KENNEDY,
C. H. ALEXANDER.